United States Patent [19]

Corby, Jr. et al.

[11] Patent Number: 4,578,561

[45] Date of Patent: Mar. 25, 1986

[54] METHOD OF ENHANCING WELD POOL BOUNDARY DEFINITION

[75] Inventors: Nelson R. Corby, Jr., Scotia; Stanley J. Godwin, Schenectady, both of N.Y.

[73] Assignee: General Electric Company, Schenectady, N.Y.

[21] Appl. No.: 641,541

[22] Filed: Aug. 16, 1984

[51] Int. Cl.$^4$ .................................... B23K 9/12

[52] U.S. Cl. ........................ 219/124.34; 219/130.01; 219/136; 358/101

[58] Field of Search .................. 219/124.34, 147, 136, 219/124.22, 130.01; 358/101

[56] References Cited

U.S. PATENT DOCUMENTS 4,225,771 9/1980 Justice et al. ...................... 219/147
4,410,787 10/1983 Kremers et al. ............... 219/124.34
4,497,996 2/1985 Libby, Jr. et al. ............ 219/124.34

FOREIGN PATENT DOCUMENTS 57-62866 4/1982 Japan ............................. 219/124.34

OTHER PUBLICATIONS

Richardson, R. W. et al., "A Vision Based System for Arc Weld Pool Size Control", Measurement and Process Control for Batch Manufacturing, ed. D. E. Hardt, ASME, Nov. 1982, pp. 65–75.

Richardson, R. D. et al., "The Measurement of Two-Dimensional Arc Weld Pool Geometry by Image Analysis", Control of Manufacturing Processes and Robotics Systems, ASME, Nov. 1983, pp. 137–148.

*Primary Examiner*—Clifford C. Shaw
*Attorney, Agent, or Firm*—Donald R. Campbell; James C. Davis, Jr.; Paul R. Webb, II

[57] ABSTRACT

The surface of the molten weld pool and surrounding workpiece area are floodlighted during an arc welding operation by a narrowband light source such as a laser in order to highlight the pool boundary and yield an image which is easily computer processed to give the pool perimeter. An arc welding torch has built-in optical systems, one to route laser energy via a coherent optical fiber bundle to exit optics on the torch to project two spots of light onto the trailing side edges of the pool, another to image the weld region which is relayed to a remote camera. The difference between reflectance values and direction on the pool and workpiece surfaces accounts for the enhanced image.

3 Claims, 7 Drawing Figures

LENS SYSTEM 17
FILTER 18
VIDEO CAMERA 19
WELD CONTROLLER 20
LIGHT SOURCES (LASER) 21
LENS SYSTEM 22
16 23 24 25 26 27 12 15 11 28 35 10 29 32 13 14

16
51
23
47
49
46
50
48
42
41
45
52
53
40
36
44
38
30
31
37
43
33
34
39
35
32

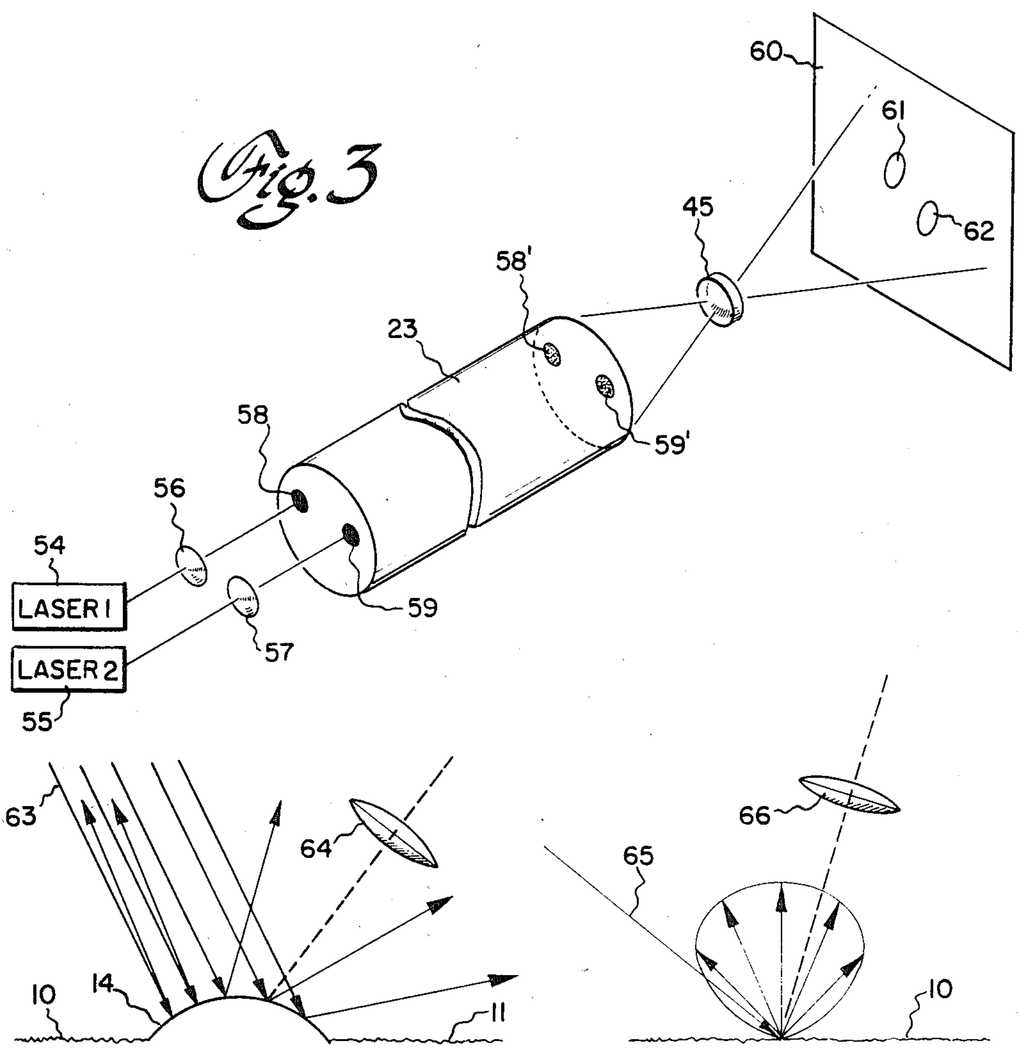
Fig. 4
Fig. 5
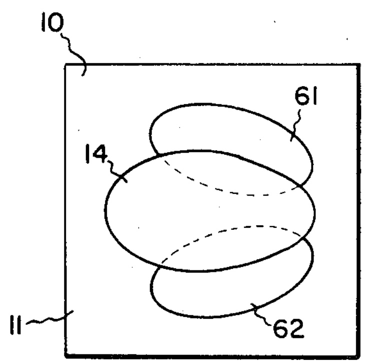
Fig. 6
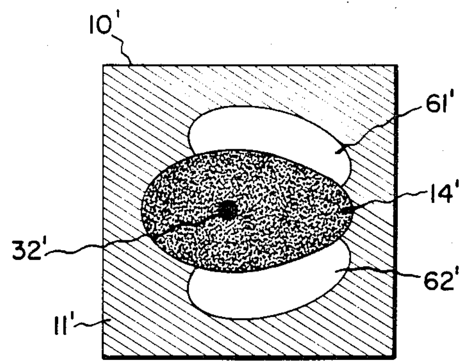
Fig. 7

METHOD OF ENHANCING WELD POOL BOUNDARY DEFINITION

BACKGROUND OF THE INVENTION

This invention relates to improving the solid/liquid boundary definition in a welding process viewed by a vision sensor, especially by an arc welding torch having an integral puddle view optical system.

Recent work on vision guided tungsten inert gas (TIG) welding supports the premise that weld quality is related to the physical shape and size of the molten weld pool under the welding electrode of the torch as it traverses its prescribed path of travel. The puddle, presently illuminated solely by the arc, is not well enough defined to allow its edge to be automatically determined by computer analysis. Tests with autogeneous welds, those using no filler wire material, produced flat weld pool surfaces with resultant seams that lay below the plate surface ("negative reinforcement"). The image formed was of a dark pool against a lighter surrounding surface. For welds with filler wire, the pool surface becomes convex and stands above the plate surface ("positive reinforcement"). Such a surface scatters the arc illumination resulting in a light gray pool image against a light gray surrounding surface. This type of image is not easily processed to yield the perimeter of the molten pool.

In allowed application Ser. No. 451,219, filed Dec. 20, 1982, now N. R. Corby, Jr., U.S. Pat. No. 4,491,719, "Light Pattern Projector Especially for Welding", it is disclosed that structured light patterns, for instance parallel laser stripes, imaged on the entrance of a coherent optical fiber bundle and passed through it to an exit lens assembly on the torch, are projected onto the workpiece and joint ahead of the weld puddle to provide navigation data, or onto the puddle itself to provide information on its shape, extent and position to control the welding process. The present inventors noted that the stripe cleanly delineated the solid/liquid pool boundary at the points where the stripe crossed the pool boundary; however, the perimeter of the pool was indistinct.

SUMMARY OF THE INVENTION

To enhance and highlight the molten weld pool boundary during the course of an arc welding operation, especially the side edges at the rear of the pool, the surface of the pool and immediate region around the pool is floodlighted or illuminated by a narrowband light source, such as a laser, introduced at an angle to the surface of the pool and surrounding workpiece area. The weld pool has a specular surface and reflects almost all of the incident light away from the optical viewing system on the welding torch, and the workpiece has a relatively rough surface and diffusely reflects incident light, an appreciable fraction of which is collected by the imaging lens. An improved image is produced for computer analysis; the weld pool is dark and the floodlighted workpiece surface is bright, and the continuous pool boundary is clearly defined (see FIG. 7).

A specific method of enhancing the solid/liquid boundary definition comprises providing two low power lasers which generate narrow beams of light that are imaged by an input lens system on the entrance of a coherent optical fiber bundle and reimaged by an output lens system as two spots of light on the rear side edges of the weld pool and adjacent plate surfaces. The size and location of the reimaged spots are changed by adjusting the size and position of the dots, or other light pattern, imaged on the bundle entrance. The improved image of the weld scene is passed along another optical fiber bundle to a video camera; in the optical path is a filter that transmits the laser light and discriminates against broadband arc light.

BRIEF DESCRIPTION OF THE DRAWINGS

FIG. 3 shows one coherent optical fiber bundle and the workpiece illumination optical system.

FIG. 4 illustrates specular reflection from the convex weld pool.

FIG. 5 illustrates diffuse reflection from the workpiece surface.

FIG. 6 is a plan view of the weld pool and two floodlighted regions.

FIG. 7 shows the image produced by the viewing optical system.

DETAILED DESCRIPTION OF THE INVENTION

Figure 1:
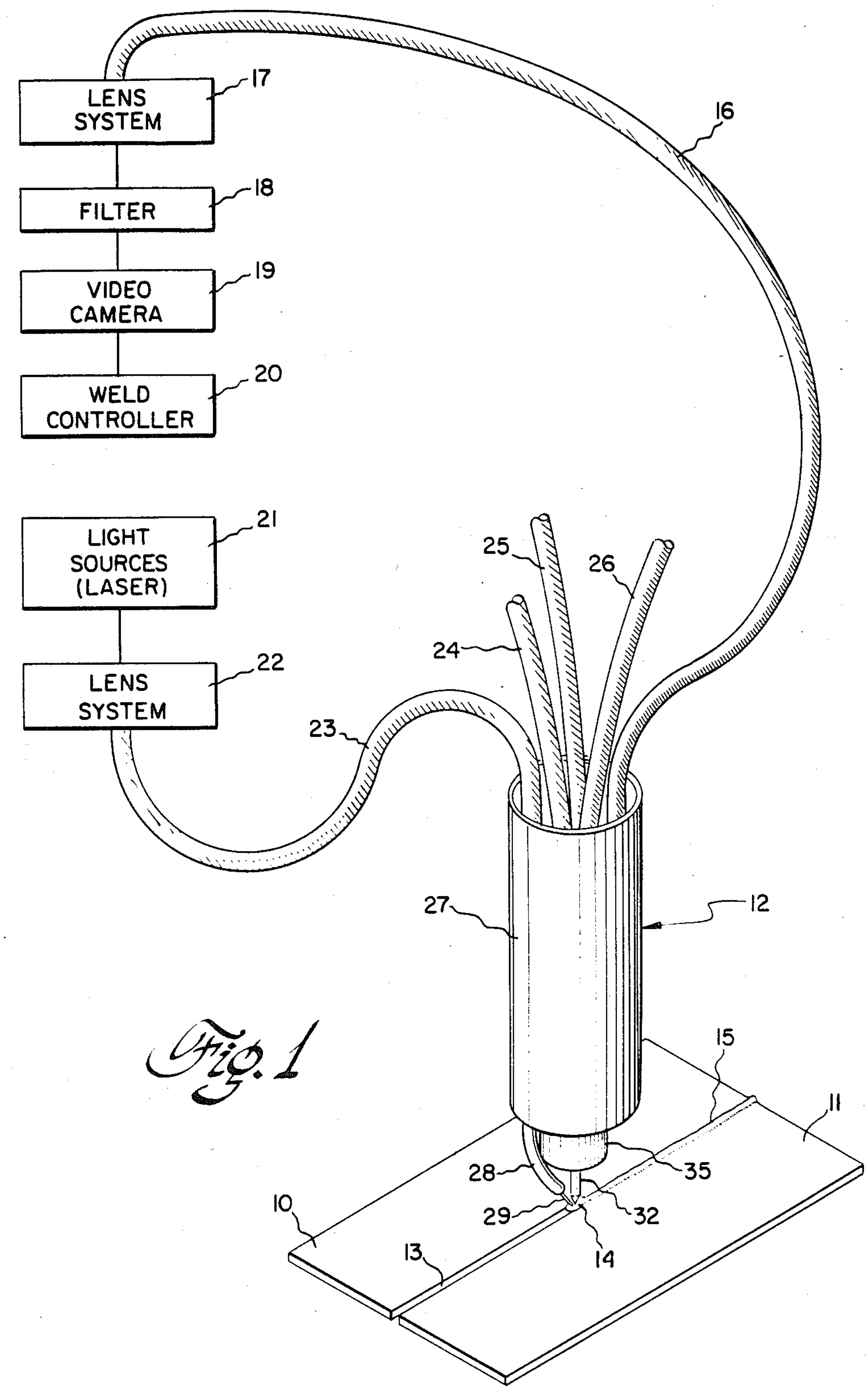
FIG. 1 is a system diagram of robotic welding with a gas tungsten arc welding (GTAW) torch having integrated optics.

In FIG. 1 is illustrated seam welding of workpieces 10 and 11 by a tungsten inert gas welding torch 12 that automatically tracks the joint 13 and has two integral optical systems to illuminate the weld puddle 14 with laser light and project a structured light pattern onto the joint just ahead of the weld puddle, and to directly view the weld region. The joint 13, structured light pattern (not shown), typically two parallel or concentric laser stripes, weld puddle 14, and remelt zone 15, are imaged on the face of a coherent optical fiber bundle 16 which transfers the image to a remotely located TV-like camera and control system. Tne image of the weld scene is magnified by a lens system 17, is sent to a narrowband filter 18 which passes the laser frequency and discriminates against the ambient arc lighting, hence to a video camera 19 such as General Electric's TN2500 Charge Injection Device camera, whose output is fed to a robot weld controller 20. Realtime analysis of the images, performed by microprocessors, is used to determine joint location and width and the geometry of the weld puddle. The motion of the robot is controlled such that the weld pool follows the joint, and information on the weld pool is used to adjust the weld current to maintain proper weld penetration. An automatic arc voltage control system is used to maintain the electrode-to-workpiece distance.

The remote components of an illumination and light pattern projection optical system are the light sources 21, preferably low power lasers, generating narrow beams that are shaped and imaged by a lens system 22 onto the entrance of a second coherent optical fiber bundle 23 along which the light patterns are transferred to the welding torch 12. The flexible cables 16 and 23, and a water/electrical power supply line 24, inert cover gas supply line 25, and water return line 26 are made to exit away from the weld area. The GTAW torch and integrated optics are encased in an insulating jacket 27. This torch has a filler wire feed, shown schematically in this figure as comprising a guide tube 28 and filler wire 29 projecting into the weld puddle 14. A commercially available wire feeder may be secured to the torch.

Figure 2:
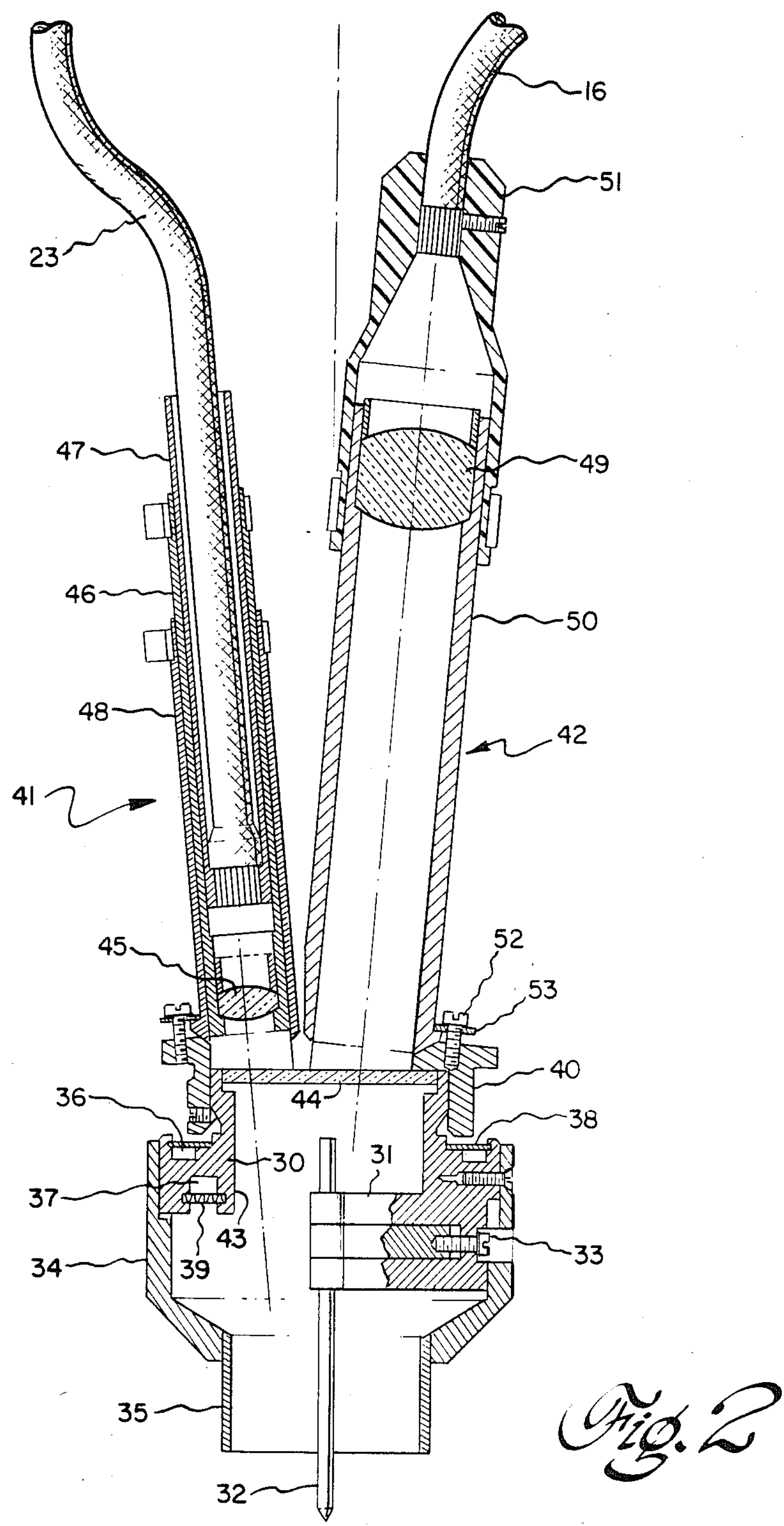
FIG. 2 is a vertical cross section through the welding torch and two integral optical systems to illuminate the molten weld puddle and image the weld region.

FIG. 2 is taken from copending allowed application Ser. No. 554,512, now U.S. Pat. No. 4,532,405, filed Nov. 23, 1983, N. R. Corby, Jr., R. M. Lund, and D. C. Peroutky, and is only briefly described here. The torch body 30 is an electrically conducting, copper ring having an inwardly projecting, integral, slim profile electrode holder 31. A downwardly projecting dog leg on the copper ring supports two stationary radial arms between which is a movable center arm. Nonconsumable tungsten electrode 32 is inserted through rings at the ends of the arms and clamped by turning a lock screw 33. The lower part of torch body 30 is seated in a metal shroud ring 34 to which is attached a gas nozzle or cup 35.

The ring-shaped torch body 30 has passages 36 and 37 for coolant and cover gas flow, the first passage being enclosed by a cover 38. The inert cover gas, typically argon or another inert gas or mixture of inert gases, exits through a gas lens 39 and through shroud 34 and gas cup 35 to purge the weld region of air. Three vertical copper tubes (not shown) are soldered in upwardly opening holes at the outer edge of torch body 30 and are connections for the coolant, electrical power, and cover gas supply lines shown in FIG. 1.

A cap 40 secured to torch body 30 provides a platform for mounting the projection optical system 41 and pool view optical system 42, arranged so their axes have a small but equal inclination to the torch electrode axis. This places the sensor optical axis at or near the angle of reflection of the pool illumination projection axis to provide for optimum interception by the viewing optics. The weld pool is viewed through the central opening 43 of the torch body 30, and the laser spots to floodlight the pool are projected through this same central aperture. A transparent, heat reflecting window 44 held between torch body 30 and cap 40 isolates the optics from the cover gas and prevents gas flow in any direction except out through gas cup 35.

Projection optical system 41 is comprised of the end face of coherent optical fiber bundle 23 and a lens 45 to image the remotely generated weld pool laser spots, which appear on the face of the optical fiber bundle, on the workpiece surface with a magnification ratio of, say, 3:1. Lens and bundle are mounted in separate tubes 46 and 47 to permit relative adjustment for focussing. The first is slidable axially inside of an outer tube 48. The viewing optical system 42 is comprised of a lens 49 which images the weld region on the entrance of optical fiber bundle 16. Slim profile electrode holder 31 is located sufficiently far from the optical focus region at the weld pool that its image is minimized in the weld scene image. Lens 49 is, for instance, a triplet and is mounted in a cylindrical metal lens housing 50. Optical fiber bundle 16 is adjustable to focus the image on the end face, and is secured in a cavity in an insulating bundle housing 51 that slides down over tube 50. A special mounting for both optical systems 41 and 42 permits their optical axes to be swiveled over a small angular range relative to the torch electrode axis. Ball and socket joints are provided between tubes 48 and 50 and cap 40, and screws 52 pass through hold down rings 53 into the cap, to facilitate making the swivel adjustment.

The optical system for floodlighting the weld pool with laser light, particularly the side edges at the trailing end, is shown isolated in FIG. 3. The entire teardrop shaped weld pool may be illuminated, however this would require a higher power laser. Further, the pool's perimeter can be determined by curve fitting if the boundaries of the side edges at the rear of the pool are known. The invention is not limited to laser sources; any monochromatic or narrowband light source may be substituted.

Two low power lasers 54 and 55, preferably Helium-Neon CW lasers, generate narrow beams of light which are imaged by input lens systems 56 and 57 as dots of light 58 and 59 on the entrance end face of coherent optical fiber bundle 23. A coherent bundle has the ends of the individual fibers arranged in identical matrices at both bundle ends, reproducing the circular images. At the exit end face of the bundle, laser dots 58′ and 59′ are reimaged by output lens system 45 on target surface 60 as two spots of light 61 and 62. A cone of light is emitted by each dot 58′ and 59′, but magnified spots 61 and 62 are oval in shape because the weld pool is illuminated at an angle to the workpiece surface and the intersection of a cone with an oblique surface is an ellipse.

The use of floodlighting or large area illumination highlights the continuous pool boundary, not just some selected points. The spot of light introduced at an angle to the workpiece and pool surface is diffusely reflected off the unmelted and remelted surrounding plate areas but is specularly reflected off the molten pool surface. The image produced is one in which the pool appears as a dark teardrop or oval surrounded by a bright zone. In this case, the pool boundary is easily discriminated. The difference between reflectance values and direction on the pool surface and on the plate surface accounts for the enhanced pool image.

For welds with filler wire, the surface of weld pool 14 is convex and stands above the surfaces of plates 10 and 11. FIG. 4 shows that the mirror-like or specular weld pool surface reflects almost all of the incident light rays 63 away from the optical sensor or viewing system here represented by a lens 64. The workpiece surface is relatively rough and diffusely reflects light rays, an appreciable fraction of which are collected by the optical sensor. FIG. 5 shows a ray 65 incident on the diffuse reflector 10, and that reflected rays are sent back in a multiplicity of directions. Some of these are collected by the optical viewing system 66.

FIG. 6 is a plan view of the workpiece surface showing only the weld pool 14 and two elliptical "floods" 61 and 62; the joint and remelted surface are not depicted. For an actual weld, the weld pool is typically ¼" wide by ⅜" long, and the "floods" are approximately ¼" wide by ¼" to ⅜" long. During the welding process the puddle tail may not be aligned with the direction of torch travel. The misalignment may be due to process disturbances or due to a curved weld path. FIG. 7 shows the image produced by the viewing optical system. The weld pool image 14′ is black or dark, the floodlighted workpiece image regions 61′ and 62′ are white or bright, and non-floodlighted workpiece image regions 10′ and 11′ are gray or less bright. The electrode image 32′ may be seen. A substantial portion of the continuous pool boundary is clearly defined in this image, which is easily processed by a computer to yield the perimeter of the molten pool. The weld scene image exiting optical fiber bundle 16, it is recalled, is presented to the narrowband filter 18, a 3 nm bandpass interference filter centered at 632.8 nm, which discriminates against the broadband arc light spectrum.

The elliptical floodlight spots 61 and 62 are positioned on the workpiece in the field of view of the optical sensor by varying the location of dots of light 58 and 59, FIG. 3, on the end face of coherent optical fiber bundle 23. The size of laser spots 61 and 62 is changed by changing the size of laser dots 58 and 59. Another light pattern, such as a comma instead of an oval, is obtained by providing a beam former, an anisotropic lens, in the input lens system to shape the beam. To produce the structured light pattern for navigation purposes, such as two parallel laser stripes, two more low power HeNe lasers are provided. The narrow light beams are formed into lines of light by cylindrical lenses and imaged on the end face of bundle 23, below the dots in FIG. 3. These stripes are reimaged by lens system 45 onto the workpiece ahead of the weld pool.

Some prior pool boundary detection approaches have made use of the ambient arc light to detect the pool boundary. The nature of the arc and its instabilities make this approach a difficult one. The presence of filler wire can also influence the arc as can variations in cover gas. Electrode tip geometry has a pronounced effect on arc position. In order to acquire a stable image of the weld pool and to enhance the solid-to-liquid boundary definition, an external source of illumination is used as described here.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a robotic arc weding operation wherein a convex-surfaced molten weld pool is created in a workpiece by the heat of an electric arc and is viewed by an optical vision system on a welding torch to guide the torch and control the welding process, the method of improving the solid/liquid boundary definition in an image for computer analysis comprising:

imaging light from a narrowband light source onto the entrance of a coherent optical fiber bundle whose exit end and an output lens system are mounted on said welding torch and which reimages light exiting said bundle to floodlight and iluminate only the surface of said weld pool and adjacent workpiece surface, incident light being introduced at an angle thereto;

said weld pool having a specular surface and reflecting almost all of the incident light away from said optical vision system, the workpiece having a rough surface and diffusely reflecting light, an appreciable fraction of which is collected by said optical vision system; and producing said image in which said weld pool is dark and the floodlighted workpiece surface is bright and the continuous pool boundary is clearly defined;

said narrowband light source comprising two low power lasers generating narrow light beams that are imaged by an input lens system as dots on the entrance of said optical fiber bundle and reimage by said output lens system as magnified oval-shaped spots onto the side edges of said weld pool and adjaccent workpiece surfaces.

2. The method of claim 1 wherein the size and location of said reimage spots are varied by changing the size and location of said dots image on the entrance of said optical fiber bundle.

3. The method of claim 1 wherein said image produced by said optical vision system is focused onto the face of a second coherent optical fiber bundle for passage to a remote video camera along an optical path containing a narrowband filter which passes laser light and blocks most arc light.

* * * * *